United States Patent
Cho et al.

(10) Patent No.: US 10,780,769 B1
(45) Date of Patent: Sep. 22, 2020

(54) POWER TRANSMISSION APPARATUS OF HYBRID ELECTRIC VEHICLE

(71) Applicants: Hyundai Motor Company, Seoul (KR); Kia Motors Corporation, Seoul (KR)

(72) Inventors: Wonmin Cho, Hwaseong-si (KR); Kijong Park, Hwaseong-si (KR); Yong Uk Shin, Suwon-si (KR); Seongwook Ji, Gunpo-si (KR); Woochurl Son, Seongnam-si (KR); Ki Been Lim, Yongin-si (KR); Ki Dong Kim, Anyang-si (KR); Woo Jin Chang, Suwon-si (KR); Seong Wook Hwang, Gunpo-si (KR); Ki Tae Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/505,410

(22) Filed: Jul. 8, 2019

(30) Foreign Application Priority Data

Apr. 25, 2019 (KR) .......................... 10-2019-0048450

(51) Int. Cl.
*B60K 6/365* (2007.10)
*B60W 10/10* (2012.01)
*B60W 50/08* (2020.01)

(52) U.S. Cl.
CPC ............. *B60K 6/365* (2013.01); *B60W 10/10* (2013.01); *B60W 50/082* (2013.01)

(58) Field of Classification Search
None
See application file for complete search history.

(56) References Cited

U.S. PATENT DOCUMENTS

| | | | | |
|---|---|---|---|---|
| 7,128,677 B2* | 10/2006 | Supina | .................. | B60W 20/40 475/5 |
| 7,690,459 B2* | 4/2010 | Schondorf | ............. | B60K 6/365 180/65.6 |
| 8,480,523 B2* | 7/2013 | Fuechtner | ................ | B60K 6/48 475/5 |
| 9,682,614 B2* | 6/2017 | Lee | ......................... | B60K 6/365 |
| 9,702,437 B2* | 7/2017 | Lee | .......................... | F16H 3/46 |
| 10,272,764 B2* | 4/2019 | Lee | ......................... | B60K 6/365 |

(Continued)

*Primary Examiner* — Dirk Wright
(74) *Attorney, Agent, or Firm* — Morgan, Lewis & Bockius LLP

(57) ABSTRACT

A power transmission apparatus of a hybrid electric vehicle using an engine and first and second motor/generators as power sources, may include a first shaft, a second shaft which is selectively connectable to the first shaft and fixedly connected to the first motor/generator, a third shaft selectively connectable to the first shaft, a fourth shaft coaxially mounted with the third shaft, a fifth shaft transferring rotational power transmitted from the third and fourth shafts to a final reduction gear, a sixth shaft fixedly connected to the second motor/generator, a seventh shaft transferring rotational power transmitted from the sixth shaft to the final reduction gear and a planetary gear set including first, second, and third rotation elements wherein the first to seventh shafts are externally gear-meshed with each other by four gear sets so that rotational power is transmitted.

9 Claims, 2 Drawing Sheets

(56) References Cited

U.S. PATENT DOCUMENTS

| | | | |
|---|---|---|---|
| 2012/0259496 A1* | 10/2012 | Ikegami | B60W 10/08 |
| | | | 701/22 |
| 2019/0047398 A1* | 2/2019 | Endo | B60K 6/40 |
| 2019/0202278 A1* | 7/2019 | Kim | B60K 6/445 |

* cited by examiner

FIG. 2

| Running mode | | | Friction element | | | | MG1 | MG2 | ENG |
|---|---|---|---|---|---|---|---|---|---|
| | | | CL1 | CL2 | CL3 | CL4 | | | |
| EV running mode | | | | | | | □ | ■ | □ |
| HEV running mode | Series mode | | ● | | ● | | ■ | ■ | ■ |
| | e-CVT mode | | | ● | ● | | ■ | ■ | ■ |
| | Parellel mode | First sub mode (1-1) | ● | ● | | ● | ■ | ▨ | ■ |
| | | Second sub mode (1-2) | | ● | | ● | □ | ■ | ■ |
| | | Second shift | ● | | ● | ● | ▨ | ■ | ■ |
| Engine running mode | First shift | | | ● | | ● | □ | □ | ■ |
| | Second shift | | ● | | ● | ● | □ | □ | ■ |

● : Operation   ■ : Driving   □ : Non-driving
▨ : Driving or Non-driving selectable ically filed on Apr. 25, 2019,
POWER TRANSMISSION APPARATUS OF HYBRID ELECTRIC VEHICLE

CROSS-REFERENCE TO RELATED APPLICATION

The present application claims priority to Korean Patent Application No. 10-2019-0048450 filed on Apr. 25, 2019, the entire contents of which is incorporated herein for all purposes by this reference.

BACKGROUND OF THE INVENTION

Field of the Invention

The present invention relates to a power transmission apparatus for a hybrid vehicle. More particularly, the present invention relates to a power transmission apparatus for a hybrid vehicle configured for improving fuel consumption by converting to an optimal running mode among three driving modes according to the driving state of the vehicle.

Description of Related Art

An environmentally-friendly technology of a vehicle is a core technology which controls survival of a future vehicle industry, and advanced vehicle makers have focused their energy on the development of an environmentally-friendly vehicle to achieve environmental and fuel efficiency regulations.

Therefore, vehicle makers have developed an electric vehicle (EV), a hybrid electric vehicle (HEV), a fuel cell electric vehicle (FCEV), and the like, as future vehicle technologies.

Since the future vehicle has various technological restrictions such as a weight and cost, the vehicle makers have paid attention to the hybrid electric vehicle as an alternative of a realistic problem for meeting exhaust gas regulations and improving fuel efficiency performance and have entered into keen competition for commercializing the hybrid electric vehicle.

The hybrid electric vehicle is a vehicle using two or more power sources. Two or more power sources may be combined by various schemes and a gasoline engine or a diesel engine using the conventional fossil fuel and a motor/generator driven by electrical energy are mixed and used as the power sources.

In the hybrid electric vehicle, an EV mode in which the hybrid electric vehicle is driven by only the motor, an HEV mode using both the engine and the motor, and an ENG mode using only the engine may be implemented according to the combination of the engine and the motor. Furthermore, the hybrid electric vehicle can acquire a significant fuel efficiency enhancement effect as compared with the conventional vehicle through idle stop of stopping the engine when the vehicle stops, fuel saving by regenerative braking that drives a generator by use of kinetic energy of the vehicle instead of braking by the existing friction when the vehicle is braked, and stores in a battery electrical energy generated at the time of driving the generator and reuses the stored electrical energy in driving the vehicle, and the like.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power transmission apparatus configured for a hybrid vehicle configured for realizing three driving modes with a simple configuration and configured for improving fuel economy by converting to an optimal driving mode for a driving state of the vehicle.

A power transmission apparatus of a hybrid electric vehicle using an engine and first and second motor/generators as power sources, the power transmission apparatus according to an exemplary embodiment of the present invention may include a first shaft fixedly connected to an output side of the engine, a second shaft fixedly connected to the first motor/generator and selectively connectable to the first shaft, a third shaft coaxially mounted with the first shaft and selectively connectable to the first shaft, a fourth shaft formed as a hollow shaft, coaxially and externally mounted with the third shaft without rotational interference therebetween, a fifth shaft mounted in parallel to at least one of the first to fourth shafts and transferring rotational power transmitted from the third and fourth shafts to a final reduction gear externally gear-meshed with, a sixth shaft mounted in parallel to at least one of the first to fourth shafts and fixedly connected to the second motor/generator, a seventh shaft mounted in parallel to at least one of the first to fourth shafts and transferring rotational power transmitted from the sixth shaft to the final reduction gear, and a planetary gear set including first, second, and third rotation elements of which the two rotation elements of the three rotation elements are rotatably connected to the third and fourth shafts independently, and the remaining one rotation element is directly connected to the fifth shaft and wherein the first to seventh shafts are externally gear-meshed with each other by four gear sets so that rotational power is transmitted.

The planetary gear set may be a single pinion planetary gear set including a sun gear, a planet carrier and a ring gear as the first, second, and third rotation elements respectively.

The first rotation element may be externally gear-meshed with the fourth shaft, the second rotation element may be fixedly connected to the fifth shaft, the third rotation element may be externally gear-meshed with the third shaft, and two rotation elements of the three rotation elements may be selectively connectable with each other.

The second rotation element and the third rotation element may be selectively connectable with each other.

The power transmission apparatus may further include four clutches selectively connecting any one of the shafts and any one of the other shafts or any one of the shafts and any one of the rotation elements.

The four clutches may include a first clutch mounted between the first shaft and the second shaft, a second clutch configured between the first shaft and the third shaft, a third clutch configured between the second shaft and the fourth shaft, and a fourth clutch configured between the second rotation element and the third rotation element.

The four gear sets may include a first gear set including a first drive gear fixed to the third shaft, and a first driven gear fixed to the third rotation element of the planetary gear set and externally gear-meshed with the first drive gear, a second gear set including a second drive gear fixed to the fourth shaft, and a second driven gear fixed to the first rotation element of the planetary gear set and externally gear-meshed with the second drive gear, a third gear set including a third drive gear fixed to the sixth shaft, and a third driven gear fixed to the seventh shaft and externally gear-meshed with the third drive gear, and a fourth gear set including a first output gear fixed to the fifth shaft, the final reduction gear externally gear-meshed with the first output gear, and a second output gear fixed to the seventh shaft and externally gear-meshed with the final reduction gear.

The power transmission device configured for a hybrid vehicle according to the exemplary embodiments of the present invention may include four friction elements, one planetary gear set, and nine external gears, and enables three hybrid modes hybrid mode {Series mode, Electronic CVT (e-CVT) mode, Parallel mode}. Thus, it is possible to improve the fuel efficiency by changing to the optimum driving mode according to the driving state of the vehicle.

Furthermore, the power transmission apparatus configured for a hybrid vehicle according to the exemplary embodiments of the present invention may contribute to reduction of production cost and weight by a simple structure.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each operation mode of a friction element applied to the power transmission apparatus configured for a hybrid vehicle according to the exemplary embodiment of the present invention.

Figure 1:
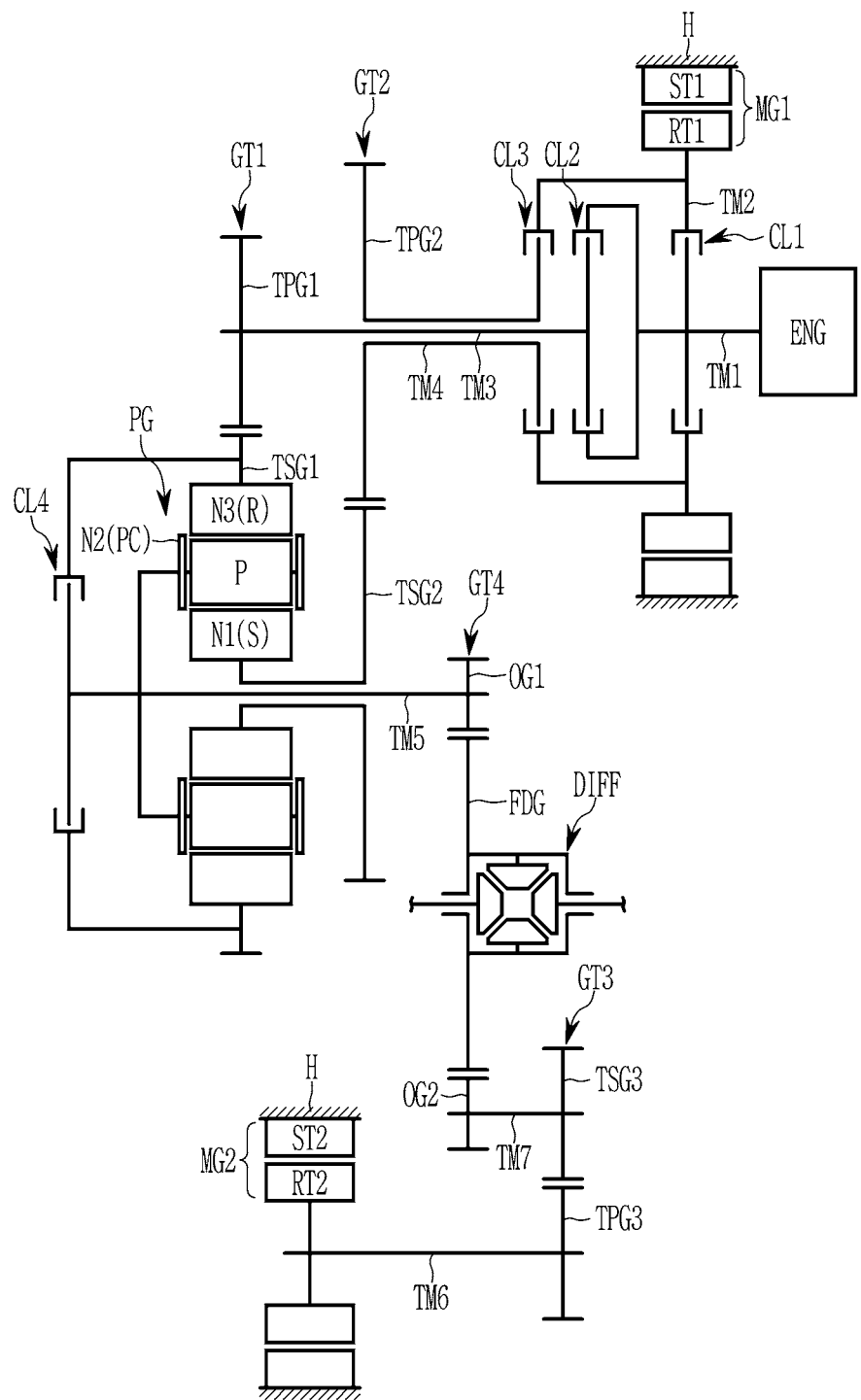
FIG. 1 is a schematic diagram of a power transmission apparatus of a hybrid vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and descriptions are to be regarded as illustrative in nature and not restrictive. Throughout the specification, the same reference numeral applies to the same or similar constituent elements.

In the following description, dividing names of components into first, second and the like is to divide the names because the names of the components are the same as each other and an order thereof is not particularly limited.

FIG. 1 is a schematic diagram of a power transmission apparatus of a hybrid vehicle according to an exemplary embodiment of the present invention.

Referring to FIG. 1, a power transmission apparatus of a hybrid electric vehicle according to an exemplary embodiment of the present invention may include an engine ENG and first and second motor/generators MG1 and MG2 as power sources, seventh shafts TM1-TM7, four friction elements CL1, CL2, CL3 and CL4 and four gear sets GT1, GT2, GT3 and GT4 and rotational powers from the engine ENG and the first and second motor/generators MG1 and MG2 are transmitted to a differential gear DIFF.

As the main power source, the engine ENG may be a known various engine such as a gasoline engine or a diesel engine using conventional fossil fuels.

The first and second motor/generators MG1 and MG2 serve as an auxiliary power source and function as a motor and a generator as known in the art and each have a first and a second stator ST1 and ST2 fixed to a transmission housing H, and a first and a second rotor RT1 and RT2 rotatably supported inside the stators ST1 and ST2 in the radial direction thereof.

The planetary gear set PG is a single pinion planetary gear set and includes a sun gear S as a first rotation element N1, a planet carrier PC as a second rotation element N2 rotatably supporting a plurality of pinion gears P externally gear-meshed with the sun gear S, and a ring gear R as a third rotation element N3 internally gear-meshed with the plurality of pinion gears P.

The engine ENG, the first and second motor/generators MG1 and MG2 and the planetary gear set PG are connected to each other via the seven shafts TM1 to TM7 to transmit power.

That is, the configuration of the seven shafts TM1 to TM7 will be described in detail.

The first shaft TM1 may be an input shaft which is fixedly connected to the output side (crankshaft) of the engine ENG and transmits the rotational power generated by the engine ENG to a transmission.

The second shaft TM2 is fixedly connected to the first rotor RT1 of the first motor/generator MG1 mounted around the first shaft TM1 as the rotation center, and is selectively connectable to the first shaft TM1.

The third shaft TM3 is mounted coaxially to the rear of the first shaft TM1 and is selectively connectable to the first shaft TM1.

And thus, the third shaft TM3 receives rotational power selectively from the first shaft TM1.

The fourth shaft TM4 formed as a hollow shaft, coaxially and externally mounted with the third shaft TM3 without rotational interference therebetween, and is selectively connectable to the second shaft TM2.

Thus, the fourth shaft TM4 may receive the rotational power of the engine ENG and the first motor/generator MG1 simultaneously, or only the rotational power of the first motor/generator MG1.

The fifth shaft TM5 is mounted parallel to the shaft TM1-TM4 and fixedly connected to the planet carrier PC as the second rotation element N2 of the planetary gear set PG.

The third rotation element N3 of the planetary gear set PG receives the rotational power of the third shaft TM3 and the first rotation element N1 receives the rotational power of the fourth shaft TM4.

The third and fourth shaft TM3 and TM4 are input via the first and third rotation elements N1 and N3, respectively, and may be shifted according to the input conditions of the rotational power to output through the fifth shaft TM5 and the rotational power of the fifth shaft TM5 is transmitted to the differential DIFF.

The planetary gear set PG is constructed so that the two rotation elements selected from among the three rotation elements N1, N2, and N3 may be selectively connectable so that planetary gear set PG rotates as a whole. In an exemplary embodiment of the present invention, the second rotation element N2 and the third rotation element N3 may be selectively connectable.

However, the exemplary embodiment of the present invention is not limited thereto, and the first rotation element N1 and the second rotation element N2 may be selectively connectable, or the first rotation element N1 and the third rotation element N3 may be selectively connectable.

The sixth shaft TM6 is mounted parallel to the axis TM1-TM5 and fixedly connected to the second motor/generator MG2.

The sixth shaft TM6 may refer to a motor shaft connected to the second rotor RT2 of the second motor/generator MG2.

The seventh shaft TM7 is mounted parallel to the axis TM1-TM6 and the seventh shaft TM7 receives the rotational power of the sixth shaft TM6 and transfers it to differential DIFF.

The shafts TM3-TM7 are externally gear-meshed with each other by the first, second, third and fourth gear sets GT1, GT2, GT3 and GT4.

The first gear set GT1 includes a first drive gear TPG1 fixed to the fourth shaft TM4, and a first driven gear TSG1 fixed to the third rotation element N3 of the planetary gear set PG and externally gear-meshed with the first drive gear TPG1.

The second gear set GT2 includes a second drive gear TPG2 fixed to the third shaft TM3, and a second driven gear TSP2 fixed to the first rotation element N1 of the planetary gear set PG and externally gear-meshed with the second drive gear TPG2.

The third gear set GT3 includes a third drive gear TPG3 fixed to the sixth shaft TM3, and a third driven gear TSG3 fixed to the seventh shaft TM7 and externally gear-meshed with the third drive gear TPG3.

The fourth gear set GT4 includes a first output gear OG1 fixed to the fifth shaft TM5, the final reduction gear FDG of the differential DIFF externally gear-meshed with the first output gear OG1, and a second output gear OG2 fixed to the seventh shaft TM7 and externally gear-meshed with the final reduction gear FDG The respective gear ratios of the first, second, and third drive gears TPG1, TPG2, and TPG3, the first, second, and third driven gears TSG1, TS2, TS3, the first and second output gears OG1 and OG2 and the final reduction gear FDG are set according to the design conditions of the transmission.

In an exemplary embodiment of the present invention, four clutches CL1, CL2, CL3 and CL4 as friction elements are mounted at the portion connecting any one of the shafts and any one of the other shafts or any one of the shafts and any one of the rotation elements.

The arrangements of the four clutches CL1, CL2, CL3 and CL4 are as follows.

The first clutch CL1 is configured between the first shaft TM1 and the second shaft TM2, and the first shaft TM1 and the second shaft TM2 are selectively connectable to provide power transmission.

The second clutch CL2 is configured between the first shaft TM1 and the third shaft TM3, and the first shaft TM1 and the third shaft TM3 are selectively connectable to provide power transmission.

The third clutch CL3 is configured between the second shaft TM2 and the third shaft TM3, and the second shaft TM2 and the third shaft TM3 are selectively connectable to provide power transmission.

The fourth clutch CL4 is configured between the second rotation element N2 and the third rotation element N3 of the planetary gear set PG, so that the planetary gear set PG is selectively directly coupled.

The friction elements of the first, second, third and fourth clutches CL1, CL2, CL3 and CL4 may be realized as multi-plate hydraulic pressure friction devices that are frictionally engaged by hydraulic pressure, however, it may not be understood to be limited thereto, since various other configuration that are electrically controllable may be available.

FIG. 2 is an operation table for each operation mode of a friction element applied to the power transmission apparatus configured for a hybrid vehicle according to the exemplary embodiment of the present invention.

[Electric Vehicle Mode (EV Running Mode)]

In the EV running mode, the second motor/generator MG2 is driven with the engine ENG stopped.

The rotational power of the second motor/generator MG2 is transmitted to the differential DIFF via the sixth shaft TM6, the third drive gear TPS3, the third driven gear TSP3, the seventh shaft TM7, and the fourth gear train GT4 to enable driving in the electric vehicle running mode.

[Series Mode]

In the series mode the first and third clutches CL1 and CL3 are operated in a state in which the engine ENG and the first and second motor/generators MG1 and MG2 are driven.

The rotational power of the engine ENG and the rotational power of the first motor/generator MG1 are joined at the second shaft TM2 by the operation of the first clutch CL1 and the rotational power of the second shaft TM2 is input to the first rotation element N1 of the planetary gear set PG through the fourth shaft TM4 and the second gear set GT2 by the operation of the third clutch CL3.

The rotational power of the second motor/generator MG2 is transmitted to differential DIFF via the sixth shaft TM6, the third gear set GT3, the seventh shaft TM7, and the fourth gear set GT4.

In the instant case, the differential DIFF is mechanically connected to the planet carrier PC which is the second rotation element N2 of the planetary gear set PG via the fourth gear set GT4 and the fifth shaft TM5, so that the series running is performed while the engine ENG and the first and second motor/generators MG1 and MG2 are complementarily controlled.

[e-CVT Mode]

The e-CVT (electrically Continuously Variable Transmission (e-CVT) is an electric CVT in which the motor/generator includes one or more planetary gear sets and two motors/generators, such as CVT, with continuously variable transmission function In the present e-CVT mode, the second and third clutches CL2 and CL3 are actuated in a state in which the engine ENG and the first and second motor/generators MG1 and MG2 are driven.

While the rotational power of the engine ENG is input to the third rotation element N3 of the planetary gear set PG by the operation of the second clutch CL2 via the third shaft TM3 and the first gear set GT1, the rotational power of the first motor/generator MG1 is input to the first rotation element N1 of the planetary gear set PG via the fourth shaft TM4 and the second gear set GT2 by the operation of the third clutch CL3.

The rotational power of the second motor/generator MG2 is transmitted to the differential DIFF via the sixth shaft TM6, the third gear set GT3, the seventh shaft TM7, and the fourth gear train GT4.

While the differential DIFF is mechanically connected to the planet carrier PC as the second rotation element N2 of the planetary gear set PG via the fourth gear set GT4 and the fifth shaft TM5, the e-CVT mode is performed by complementary control of the first and second motor/generators MG1 and MG2.

In the series mode, the engine ENG and the first motor/generator MG1 are integrally and mechanically connected to the first rotation element N1 of the planetary gear set PG via the same path, however in the e-CVT mode, the engine ENG and the first motor/generator MG1 are mechanically connected to the first and third rotation elements N1 and N3 of the planetary gear set PG via different paths, respectively.

[Parallel Mode First Shift]

The parallel mode first shift is performed as a first sub mode 1-1 and a second sub mode 1-2. In the first sub mode (1-1), the engine ENG and the first motor/generator MG1 are driven and the first, second, fourth clutches CL1, CL2, and CL4 are operated.

As such, the rotational power of the engine ENG and the rotational power of the first motor/generator MG1 are joined at the first shaft TM1 by the operation of the first clutch CL1 and transmitted to the third rotation element N3 of the planetary gear set PG via the third shaft TM3 and the first gear set GT1 by the operation of the second clutch CL2.

Since the planetary gear set PG is rotates as a whole by the operation of the fourth clutch CL4, the input is directly output through the fifth shaft TM5 and the rotational power of the fifth shaft TM5 is transmitted to the differential DIFF via the fourth gear set GT4 to perform the first sub mode 1-1 of the parallel mode first shift.

At the instant time, the second motor/generator MG may be selected to be driven or not driven.

In the second sub mode 1-2 of the parallel mode first shift, the engine ENG and the second motor/generator MG2 are driven and the second and the fourth clutches CL2 and CL4 are operated.

The rotational power of engine ENG is transmitted to the third rotation element N3 of the planetary gear set PG via the third shaft TM3 and the first gear set GT1 by the operation of the second clutch CL2.

Since the planetary gear set PG is rotates as a whole by the operation of the fourth clutch CL4, the input is directly output through the fifth shaft TM5 and the rotational power of the fifth shaft TM5 is transmitted to the differential DIFF via the fourth gear set GT4.

The rotational power of the second motor/generator MG2 is transmitted to the differential DIFF through the sixth shaft TM6, the third gear set GT3, the seventh shaft TM7, and the fourth gear set GT4 to perform the second sub mode 1-2 of the parallel mode first shift.

At the instant time, the rotational power of the second motor/generator MG2 is controlled as the auxiliary power of the engine ENG, and the first motor/generator MG1 is not driven.

[Parallel Mode Second Shift]

In the parallel mode second shift, the first, third and fourth clutches CL1, CL3, and CL4 are operated in a state in which the engine ENG and the second motor/generator MG2 are driven.

The rotational power of the engine ENG is transmitted to the first rotation element N1 of the planetary gear set PG via the second shaft TM2, the fourth shaft TM4 and the second gear set GT2 by the operation of the first and third clutches CL1 and CL3.

Since the planetary gear set PG is rotates as a whole by the operation of the fourth clutch CL4, the input is directly output through the fifth shaft TM5 and the rotational power of the fifth shaft TM5 is transmitted to the differential DIFF via the fourth gear set GT4.

The rotational power of the second motor/generator MG2 is transmitted to the differential DIFF through the sixth shaft TM6, the third gear set GT3, the seventh shaft TM7, and the fourth gear set GT4 to perform the parallel mode second shift.

At the instant time, the rotational power of the second motor/generator MG2 is controlled as the auxiliary power of the engine ENG; and the first motor/generator MG1 may be selected to be driven or not driven.

[Engine Running Mode First Shift]

In the engine running mode first shift, the second and fourth clutches CL2 and CL4 are operated in a state in which the engine ENG is being driven.

The rotational power of engine ENG is transmitted to the third rotation element N3 of the planetary gear set PG via the third shaft TM3 and the first gear set GT1 by the operation of the second clutch CL2.

Since the planetary gear set PG is rotates as a whole by the operation of the fourth clutch CL4, the input is directly output through the fifth shaft TM5 and the rotational power of the fifth shaft TM5 is transmitted to the differential DIFF via the fourth gear set GT4 to perform the engine running mode first shift.

That is, while the rotational power of the engine ENG is shifted by the gear ratio of the first gear set GT1 and the fourth gear set GT4 and outputted, the engine running mode first shift is performed.

[Engine Running Mode Second Shift]

In the engine running mode second shift, the first, third and fourth clutches CL1, CL3, and CL4 are operated in a state in which the engine ENG is being driven.

The rotational power of the engine ENG and the rotational power of the first motor/generator MG1 are joined at the second shaft TM2 by the operation of the first clutch CL1 and the rotational power of the second shaft TM2 is input to the first rotation element N1 of the planetary gear set PG through the fourth shaft TM4 and the second gear set GT2 by the operation of the third clutch CL3.

Since the planetary gear set PG is rotates as a whole by the operation of the fourth clutch CL4, the input is directly output through the fifth shaft TM5 and the rotational power of the fifth shaft TM5 is transmitted to the differential DIFF via the fourth gear set GT4 to perform the engine running mode second shift.

That is, while the rotational power of the engine ENG is shifted by the gear ratio of the second gear set GT2 and the fourth gear set GT4 and outputted, the engine running mode second shift is performed.

As describe above, the power transmission apparatus configured for a hybrid vehicle according to the exemplary embodiments of the present invention includes four friction elements, one planetary gear set, and nine external gears, and may implements three driving modes including a series mode, an e-CVT Mode and a parallel mode. Therefore, the mileage may be improved by changing the driving mode according to the driving state of the vehicle The power transmission apparatus configured for a hybrid vehicle according to the exemplary embodiments of the present invention can contribute to the reduction of production cost and the weight reduction by a simple structure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmission apparatus of a hybrid electric vehicle using an engine and first and second motor/generators as power sources, the power transmission apparatus comprising:
    a first shaft fixedly connected to an output side of the engine;
    a second shaft fixedly connected to the first motor/generator and selectively connectable to the first shaft;
    a third shaft coaxially mounted with the first shaft and selectively connectable to the first shaft;
    a fourth shaft formed as a hollow shaft, coaxially and externally mounted with the third shaft without rotational interference therebetween, wherein the fourth shaft is selectively connectable to the second shaft;
    a fifth shaft mounted in parallel to at least one of the first to fourth shafts and transferring rotational power transmitted from the third and fourth shafts to a final reduction gear;
    a sixth shaft mounted in parallel to at least one of the first to fourth shafts and fixedly connected to the second motor/generator;
    a seventh shaft mounted in parallel to at least one of the first to fourth shafts and transferring rotational power transmitted from the sixth shaft to the final reduction gear; and
    a planetary gear set including three rotation elements including first, second, and third rotation elements, wherein two rotation elements of the three rotation elements are rotatably connected to the third and fourth shafts respectively, and a remaining one rotation element of the three rotation elements is fixedly connected to the fifth shaft,
    wherein the first to seventh shafts are gear-meshed with each other by four gear sets.

2. The power transmission apparatus of claim 1,
    wherein the two rotation elements of the three rotation elements that are rotatably connected to the third and fourth shafts respectively, are the third rotation element and first rotation shaft respectively, and
    wherein the remaining one rotation element of the three rotation elements that is fixedly connected to the fifth shaft is the second rotation element.

3. The power transmission apparatus of claim 2, wherein the planetary gear set is a single pinion planetary gear set including a sun gear, a planet carrier and a ring gear as the first, second, and third rotation elements respectively.

4. The power transmission apparatus of claim 2, wherein the four gear sets comprise:
    a first gear set including a first drive gear fixed to the third shaft and a first driven gear fixed to the third rotation element of the planetary gear set and gear-meshed with the first drive gear; and
    a second gear set including a second drive gear fixed to the fourth shaft, and a second driven gear fixed to the first rotation element of the planetary gear set and gear-meshed with the second drive gear.

5. The power transmission apparatus of claim 2,
    wherein the first rotation element is gear-meshed with the fourth shaft;
    wherein the second rotation element is fixedly connected to the fifth shaft;
    wherein the third rotation element is gear-meshed with the third shaft; and
    wherein two rotation elements of the three rotation elements are selectively connectable with each other.

6. The power transmission apparatus of claim 5,
    wherein the two rotation elements of the three rotation elements which are selectively connectable with each other are the second rotation element and the third rotation element.

7. The power transmission apparatus of claim 1, further including four clutches selectively connecting one of the first to fifth shafts and another of the first to fifth shafts or one of the first to fifth shafts and one of the three rotation elements.

8. The power transmission apparatus of claim 7, wherein the four clutches includes:
    a first clutch mounted between the first shaft and the second shaft;
    a second clutch mounted between the first shaft and the third shaft;
    a third clutch mounted between the second shaft and the fourth shaft; and
    a fourth clutch mounted between the second rotation element and the third rotation element.

9. The power transmission apparatus of claim 1, wherein the four gear sets comprise:
    a first gear set including a first drive gear fixed to the third shaft and a first driven gear fixed to the third rotation element of the planetary gear set and gear-meshed with the first drive gear;
    a second gear set including a second drive gear fixed to the fourth shaft, and a second driven gear fixed to the first rotation element of the planetary gear set and gear-meshed with the second drive gear;

a third gear set including a third drive gear fixed to the sixth shaft, and a third driven gear fixed to the seventh shaft and gear-meshed with the third drive gear; and a fourth gear set including a first output gear fixed to the fifth shaft, the final reduction gear gear-meshed with the first output gear, and a second output gear fixed to the seventh shaft and gear-meshed with the final reduction gear.

\* \* \* \* \*